No. 895,962. PATENTED AUG. 11, 1908.
C. CHASE.
APPARATUS FOR COOLING AIR.
APPLICATION FILED NOV. 6, 1907.
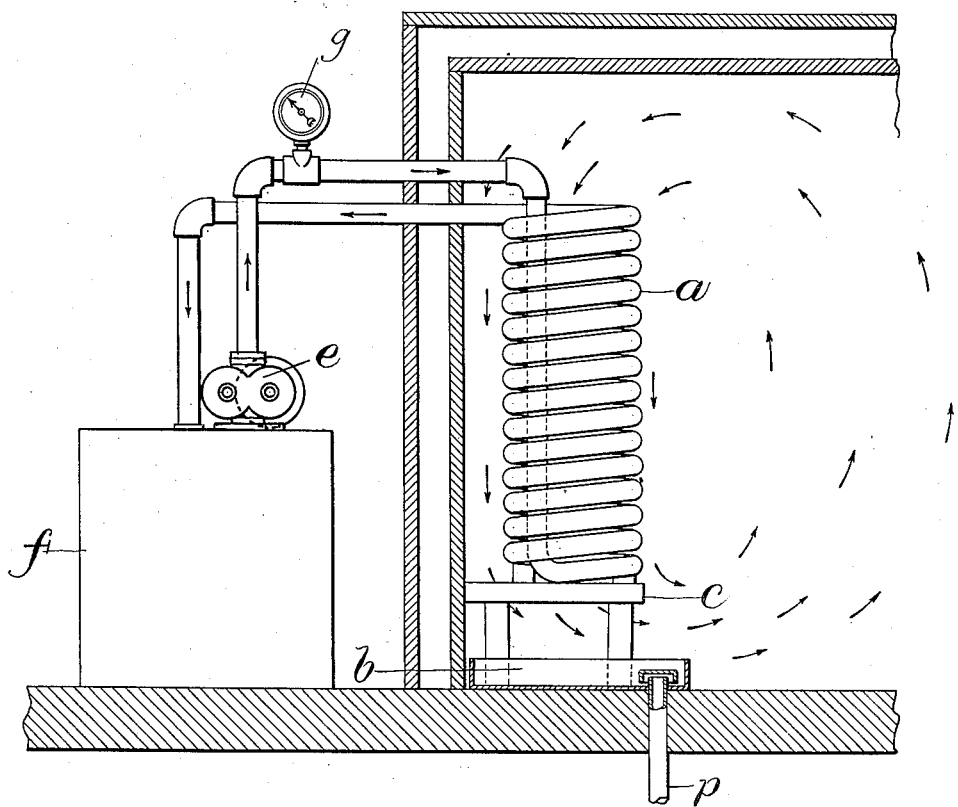
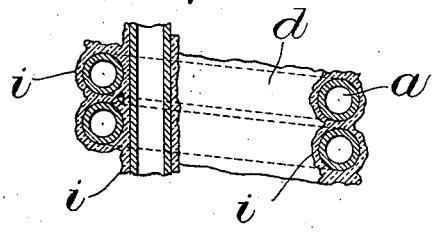
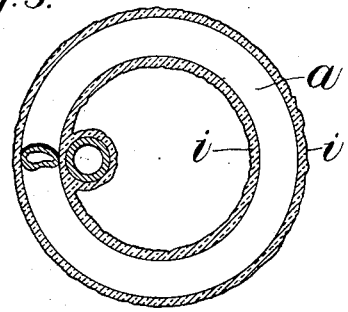
Witnesses:
A. C. Ratigan
B. W. Glover
Inventor:
Confucius Chase
by Munn & Brown Dunby Ally
Attorneys.

UNITED STATES PATENT OFFICE.

CONFUCIUS CHASE, OF BOSTON, MASSACHUSETTS, ASSIGNOR OF ONE-HALF TO WILLARD E. ROBINSON, OF WINCHESTER, MASSACHUSETTS.

APPARATUS FOR COOLING AIR.

No. 895,962.  Specification of Letters Patent.  Patented Aug. 11, 1908.

Application filed November 6, 1907. Serial No. 400,917.

*To all whom it may concern:*

Be it known that I, CONFUCIUS CHASE, of Boston, in the county of Suffolk and State of Massachusetts, have invented certain new and useful Improvements in Apparatus for Cooling and Purifying Fluids, of which the following is a specification.

This invention has for its object to cool, dry and purify the air of a dwelling house or sick chamber, to maintain a low temperature in a preserving chamber containing food articles, and to cool bodies of water or other fluids.

A secondary object is to provide such a cooling device which will automatically maintain a circulation of the air, water or other fluid to be cooled so that all parts of the chamber or space containing the fluid acted upon will be maintained at nearly a uniform temperature, and, when the fluid is air, will be filled in all parts with dry, pure air.

The apparatus consists of a pipe coiled helically so as to make practically a cylinder, and which is held substantially vertical or at least so nearly upright that one end of the coil or cylinder is appreciably higher than the other. A circulating medium having a low temperture is forced through the pipe, which is so supported that both ends of the cylindrical space inclosed by the coil are open and free for the passage of the air or other fluid being acted on.

Of the accompanying drawings,—Figure 1 represents in elevation, an apparatus embodying the principles of my invention, applied for cooling, purifying and drying the air contained in an inclosed space, such as a preserving chamber or room of a dwelling house. Fig. 2 represents a fragmentary vertical section, showing the appearance of the pipe after it has been maintained at a low temperature sufficiently long to become coated with frost or ice. Fig. 3 represents a horizontal sectional view of the same.

The same reference characters indicate the same parts in all the figures.

As shown in the drawings, I provide a cylinder or tube constructed from a pipe $a$ which is coiled helically with its convolutions close to one another. When contained in a room it is supported above a drip-pan at a sufficient height to permit flow of air beneath it, being held upon a frame or grid $c$ which stands in the drip-pan. The coil incloses a cylindrical air space $d$ which is open at the top and bottom and is unobstructed in its interior. The inlet end of the coiled pipe is connected with a pump $e$ which draws circulating fluid from a reservoir $f$. This fluid may of course be any of those commonly used in refrigeration, and preferably has a temperature lower than the freezing point of water. Ordinarily it would be a brine formed by the melting of a mixture of ice and salt in the tank $f$. This reservoir and pump may be located at any convenient place near to or at a distance from the chamber to be cooled. On the inlet pipe of the coil is a thermometer $g$ by which the temperature of the freezing mixture in the coil may be indicated.

When the apparatus is employed in performing its functions, the reservoir is charged with the freezing mixture which the pump passes through the coil, causing it to enter at the bottom and to discharge from the top into the reservoir, as indicated by the arrows. Accordingly, the bottom of the coil contains the coldest fluid before it has had time to receive heat from the surrounding medium, while the warmest portion of the mixture is at the top of the coil. As the inlet portion of the coiled pipe passes through the coil close to one side thereof and parallel to its axis in a straight line, it affords practically no obstruction to the interior space $d$, nor impediment to the free flow of air through the same. The coil is held with its axis as nearly vertical as possible, or at any rate, in other than a horizontal position, so that the air contained in the space $d$ will, as it becomes chilled, fall and be discharged from the bottom of the space.

As the circulating fluid in the pipe is a freezing mixture, the outside of the pipe very quickly becomes covered with moisture precipitated from the air, which, freezing, forms a frost. This icy covering increasing with successive deposits of moisture, causes the convolutions to merge into one another and wholly fills the spaces between them, as indicated in Figs. 2 and 3, where the letter $i$ represents the icy coating. Thus the coil becomes in effect a continuous tube of ice, or in other words, an icy air flue.

The automatic action of the coil in inducing a circulation and cooling of the air will be now understood. First, the air contained within the ice tube is chilled and by its increased density and weight, falls. This leaves a partial vacuum at the top of the tube into which the surrounding air flows from all directions. This air becoming in turn chilled, forces out the air already within the tube, causing it to flow from the bottom thereof and pass in all directions into the outer space. This action continues indefinitely, the ice tube acting as a pump, continually drawing warm air from above, forcing it downward, and discharging cold air from the bottom.

The air as it becomes warmed in the surrounding space, absorbs the moisture and impurities of the room, but when chilled by contact with the walls of the tube, loses its capacity to contain so much moisture and causes the excess to be deposited as a frost. As the particles of moisture form themselves about whatever grains of dust or other impurities or disease germs there may be in the air, these impurities are deposited at the same time, so that the air is at once dried, cooled and purified. Owing to this automatic action, the entire body of air in the room is, within a brief time, drawn through the tube and made very dry, pure and cold, while the ice coating is loaded with all the disease germs, dust and other impurities formerly floating freely in the air. By stopping the flow of the freezing mixture through the pipe for a short period, or forcing a warm fluid through the same, the ice coating is melted from the coil and caused to drop into the pan, by which it may readily be safely removed. The melted ice is conducted from the pan through a drip pipe $p$ to a dry well, where it is absorbed by the earth.

It is to be understood that this apparatus is not confined in its application to the cooling, drying and purifying of air, but it may be used for chilling bodies of water and other fluids. When immersed in water, the coil becomes coated with clear ice, forming an ice tube, which acts upon the water in the same manner as described in relation with air. The water or any other medium is caused to circulate by the thermodynamic action in the manner already described, and indicated by the arrows in Fig. 1.

I claim:—

1. A cooling apparatus, consisting of a helical coil of pipe exposed both within and without the helix to the outer encompassing medium, and having its convolutions separated by spaces less than the thickness of the pipe, means for causing a freezing fluid to flow through the pipe, whereby the moisture of the surrounding medium is caused to condense and freeze on the pipe, filling the spaces between the convolutions, and a support holding the coil substantially upright with provisions for free flow longitudinally into, through, and out of, the same of the surrounding medium, whereby the latter is caused automatically to flow toward the top of, into, downwardly through, and out of the coil.

2. A device for cooling and producing automatically a circulation of air or other fluid, consisting of a pipe through which a freezing fluid is circulated, coiled so as to inclose a cylindrical space and supported so that such space is open at both ends, the coils being so close together as to cause the frost and ice formed on the pipe by the freezing of moisture deposited from the air to stop the interstices, whereby air is prevented from flowing between the convolutions of the coil and is compelled to enter the top of the coil, pass downward within the same as it becomes chilled, and emerge from the bottom.

In testimony whereof I have affixed my signature, in presence of two witnesses.

CONFUCIUS CHASE.

Witnesses:
ARTHUR H. BROWN,
A. C. RATIGAN.